US010505624B2

(12) United States Patent
Fourtet et al.

(10) Patent No.: US 10,505,624 B2
(45) Date of Patent: Dec. 10, 2019

(54) METHOD FOR PROCESSING THE DOPPLER EFFECT OF A SIGNAL TRANSMITTED BY A TRANSMITTER DEVICE TO A NON-GEOSYNCHRONOUS SATELLITE

(71) Applicant: SIGFOX, Labege (FR)

(72) Inventors: Christophe Fourtet, Pompignan (FR); David Fernandez, Toulouse (FR)

(73) Assignee: SIGFOX (FR)

( * ) Notice: Subject to any disclaimer, the term of this patent is extended or adjusted under 35 U.S.C. 154(b) by 0 days.

(21) Appl. No.: 16/469,362

(22) PCT Filed: Dec. 14, 2017

(86) PCT No.: PCT/FR2017/053591
§ 371 (c)(1),
(2) Date: Jun. 13, 2019

(87) PCT Pub. No.: WO2018/109411
PCT Pub. Date: Jun. 21, 2018

(65) Prior Publication Data
US 2019/0312634 A1 Oct. 10, 2019

(30) Foreign Application Priority Data

Dec. 15, 2016 (FR) .................... 16 62549

(51) Int. Cl.
H04B 7/19 (2006.01)
H04B 7/195 (2006.01)
(Continued)

(52) U.S. Cl.
CPC .......... H04B 7/195 (2013.01); H04L 7/0331 (2013.01); H04W 56/0035 (2013.01)

(58) Field of Classification Search
CPC ............ H04W 56/0035; H04W 84/06; H04W 56/001; H04W 72/02; H04W 92/18;
(Continued)

(56) References Cited

U.S. PATENT DOCUMENTS 6,058,306 A * 5/2000 Liu ................. H04B 7/208
342/357.29
6,308,076 B1 * 10/2001 Hoirup ............ H04B 7/2125
370/324
(Continued)

FOREIGN PATENT DOCUMENTS

EP 1006679 6/2000

OTHER PUBLICATIONS

International Search Report dated Mar. 8, 2018 for International Application No. PCT/FR2017/053591.
(Continued)

Primary Examiner — Nhan T Le
(74) Attorney, Agent, or Firm — Perman & Green, LLP

(57) ABSTRACT

A method is provided for transmitting a signal by a transmitter device to a satellite moving in orbit around the Earth, the transmitter device and the satellite including wireless telecommunication means.
The method includes receiving, by the transmitter device, a signal transmitted by the satellite, termed the presence signal, analyzing a frequency shift induced by the Doppler effect on the presence signal received by the transmitter device, estimating a later change over time of the frequency shift starting from a later predetermined time of the beginning of transmission of the signal to be transmitted by the transmitter device and over a predetermined duration of the signal to be transmitted, and precompensating the later change over time estimated from the frequency shift on the signal to be transmitted.

9 Claims, 4 Drawing Sheets

(51) Int. Cl.
*H04W 56/00* (2009.01)
*H04L 7/033* (2006.01)

(58) Field of Classification Search
CPC .... H04B 7/18513; H04B 10/118; H04B 7/01; H04B 7/18523; H04B 10/0795; H04B 10/07957; H04B 7/12; H04B 7/068; H04B 7/0689; H04L 1/1867; H04L 5/14
See application file for complete search history.

(56) References Cited

U.S. PATENT DOCUMENTS

| | | | |
|---|---|---|---|
| 9,057,785 B1* | 6/2015 | Lee | G01S 13/95 |
| 9,184,828 B2* | 11/2015 | Mineta | H04J 13/10 |
| 9,453,903 B2* | 9/2016 | Robinson | G01S 19/11 |
| 2010/0290356 A1 | 11/2010 | Hadad et al. | |
| 2012/0313815 A1 | 12/2012 | Yang | |
| 2014/0044434 A1* | 2/2014 | Hashimoto | H04B 10/118 |
| | | | 398/125 |

OTHER PUBLICATIONS

"Map Estimation Based on Doppler Characterization in Broadband and Mobile LEO Satelitte Communications" Lin Jiangnan et al (5 pages), 2016 IEEE 83rd Vehicular Technology Conference (VTC Spring), IEEE, May 15, 2016 (May 15, 2016).

* cited by examiner

METHOD FOR PROCESSING THE DOPPLER EFFECT OF A SIGNAL TRANSMITTED BY A TRANSMITTER DEVICE TO A NON-GEOSYNCHRONOUS SATELLITE

CROSS REFERENCE TO RELATED APPLICATIONS

This application is a National Stage of International Application No. PCT/FR2017/053591, having an International Filing Date of 14 Dec. 2017, which designated the United States of America, and which International Application was published under PCT Article 21(2) as WO Publication No. 2018/109411 A1, which claims priority from and the benefit of French Patent Application No. 1662549, filed on 15 Dec. 2016, the disclosures of which are incorporated herein by reference in their entireties.

BACKGROUND

1. Field

The present disclosure belongs to the field of wireless telecommunication systems and relates more particularly to a method for transmitting a signal between at least one transmitter device and at least one satellite moving in orbit.

The present disclosure has in particular an application in the field of connected objects.

This present disclosure has a particularly advantageous application, although in no way limiting, in ultra narrow band wireless telecommunication systems. The term "ultra narrow band" (UNB) means that the instantaneous frequency spectrum of the radio signals transmitted by a transmitter device, to a satellite, has a frequency width of less than two kilohertz, even less than one kilohertz.

Such UNB wireless telecommunication systems are particularly suited for applications of the M2M (Machine-to-Machine") type or of the "Internet of Things" (IoT) type.

2. Brief Description of Related Developments

One of the major disadvantages of wireless telecommunication systems that comprise a transmitter device and a non-geosynchronous satellite is the appearance of the Doppler effect which disturbs the transmission of the signals between the transmitter device and the satellite. The Doppler effect, which is a function of the speed of the moving object and of the angle between the velocity vector of the moving object and the direction between the two objects, constantly modifies the frequency of the signals transmitted. Thus, for the receiving of a signal that was transmitted on a transmission frequency that is constant over time, the receiving frequency of the signal at the beginning of receiving is different from the receiving frequency of the signal at the end of receiving. The variation in the receiving frequency over time can furthermore be substantial due to the fact, for applications of the M2M or IoT type, the data flow rate is generally low in such a way that the duration of the signal can be substantial. This change in the receiving frequency over time makes detecting such signals complex on the satellite.

Another disadvantage induced by the appearance of the Doppler effect on the signals is the decrease in the capacity of the communication channel for the same bandwidth.

Moreover, the Doppler effect also implies the increase in the number of collisions between signals.

SUMMARY

This present disclosure has for objective to overcome all or a portion of the limitations of the solutions of prior art, in particular those disclosed hereinabove, by proposing a solution that allows a satellite of a telecommunication system to more easily detect signals transmitted by transmitter devices and/or to reduce the collisions between signals transmitted by such transmitter devices.

To this effect, and according to a first aspect, the present disclosure relates to a method for transmitting a signal by a transmitter device to a satellite moving in orbit around the Earth, said transmitter device and the satellite comprising wireless telecommunication means.

The term transmitter device means any object provided with a telecommunication means that can transmit a signal. The transmitter device can be for example a connected object. The term connected object means any apparatus connected to a data exchange computer network of the Internet type, that can be remotely queried or controlled. The connected object is of any type. It can be for example a weather station that collects indoor and outdoor temperature data from a dwelling, a sensor for measuring the level of liquid or gas in a tanker or a tank, a detector of the occupation of a parking spot, a sensor for measuring the flow of persons accessing a building, etc. The connected object can also be a relay base between a connected apparatus and a network. This relay base can act as a repeater or buffer by storing data to be transmitted to the network in a computer memory of the relay base.

According to the present disclosure, said method comprises the steps of:
  receiving, by said transmitter device, a signal transmitted by the satellite, termed the presence signal;
  analyzing at least one frequency shift induced by the Doppler effect on the presence signal received by said transmitter device, the step of analyzing comprising a measurement of a change over time of the frequency shift induced by the Doppler effect on the presence signal;
  estimating, according to the analysis of the frequency shift induced by the Doppler effect on the presence signal, a later change over time of said frequency shift from a later predetermined time of the beginning of transmission of the signal to be transmitted by the transmitter device, termed the transmission time, and over a predetermined duration of said signal to be transmitted;
  precompensating the later change over time estimated from the frequency shift on the signal to be transmitted;
  transmitting of the signal by said transmitter device from the transmission time.

Thus, the signal transmitted by the transmitter device which can be precompensated during most of the transmission thereof, even preferably at each instant of the transmission thereof, is received by the satellite without any apparent Doppler effect. In other terms, by taking the example of a signal comprising a constant carrier frequency before precompensating, the signal is precompensated before or at the time of transmission so that the receiving frequency of the carrier of the signal received by the satellite is constant.

During the step of analyzing, the change over time of the frequency shift induced by the Doppler effect can be measured by measuring the time variation of a main frequency of the presence signal. The main frequency of the presence signal is representative for example of the frequency of a carrier of said presence signal, or of the frequency of a subcarrier of said presence signal, of a central frequency of an instantaneous frequency spectrum of said presence signal, of a minimum or maximum frequency of said instantaneous frequency spectrum, etc. The time variation of the main frequency of the presence signal received is in principle similar to the time variation of the frequency shift, in particular when the presence signal is transmitted with a main frequency that is constant over time. The time variation of the main frequency can be measured directly by measuring the difference between the main frequency at two different respective instants or indirectly by measuring the main frequency in at least two different respective instants, and by calculating the difference between the main frequencies measured.

Moreover, the analysis of the precompensated signal received by the satellite is easier to carry out, as it does not require any specific processing of the signal received in order to overcome the Doppler effect, de facto reducing the number of calculations required to detect and possible demodulate the signal received.

On the other hand, taking account that the time variation of the frequency shift induced by the Doppler effect is not apparent, algorithms and computer programs suitable for immobile objects can be reused without requiring any particular adaptation.

It should be underlined that only the time variation of the frequency shift, or time drift of the frequency, due to the Doppler effect, is corrected. Indeed, the precompensating takes account only of the change over time of the frequency shift, not the absolute value of the frequency shift. In other terms, the receiving frequency of the carrier of the signal received is substantially constant if the carrier before precompensating is of a constant frequency, but can however be shifted with respect to the theoretical frequency of said carrier of said signal due to the frequency shift induced by the Doppler effect. Thus, the precompensating aims to obtain a frequency shift induced by the Doppler effect that is perceived on the satellite as being invariant over time.

In particular aspects of the present disclosure, the method for transmitting can further comprise one or several of the following characteristics, taken separately or according to any technically permissible combinations.

In particular aspects of the present disclosure, the step of precompensating the later change over time of the frequency shift comprises a modulation of the signal to be transmitted with a frequency opposite the later change over time.

In particular aspects of the present disclosure, the later change over time of the frequency shift is estimated by extrapolation of the change over time of the frequency shift measured the presence signal.

In particular aspects of the present disclosure, the measured change over time of the frequency shift is represented by a curve of which the parameters are calculated by a curve-fitting method.

Curve-fitting methods are also known under the name of regression methods.

In particular aspects of the present disclosure, the step of analyzing comprises a measurement of a main frequency of the presence signal and an estimation of a frequency shift induced by the Doppler effect on the presence signal according to the main frequency measured and according to a theoretical main frequency of said presence signal, said method also comprising the steps of:

estimating, according to the estimated frequency shift on the presence signal, a later frequency shift induced by the Doppler effect to the effect of the transmission time of the signal to be transmitted, precompensating of the later frequency shift on the signal to be transmitted.

In such aspects of the present disclosure, the precompensating therefore aims to cancel not only the time variation of the frequency shift induced by the Doppler effect on satellite, but also to cancel the absolute value of said frequency shift on said satellite. Thus, the precompensating makes it possible to furthermore obtain that the frequency of the carrier of the signal received by the satellite is substantially equal to the theoretical frequency of the carrier of the signal transmitted by the transmitter device.

In particular aspects of the present disclosure, the step of analyzing implements a phase-locked loop.

In particular aspects of the present disclosure, the transmission of the presence signal is carried out continuously over a predetermined period.

According to a second aspect, this present disclosure relates to a transmitter device of a wireless telecommunication system, implementing a method of transmission according to any of the embodiments of the present disclosure.

In particular aspects of the present disclosure, the transmitter device is a connected object.

According to a third aspect, this present disclosure relates to a wireless telecommunication system that comprises at least one transmitter device according to any of the embodiments of the present disclosure and at least one satellite moving in orbit around the Earth.

BRIEF DESCRIPTION OF THE DRAWINGS

The present disclosure shall be better understood when reading the following description, given as an example that is in no way limiting, and given in reference to the figures which show.

In these figures, identical references from one figure to another designate identical or similar elements. For reasons of clarity, the elements shown are not to scale, unless mentioned otherwise.

DETAILED DESCRIPTION

Figure 1:
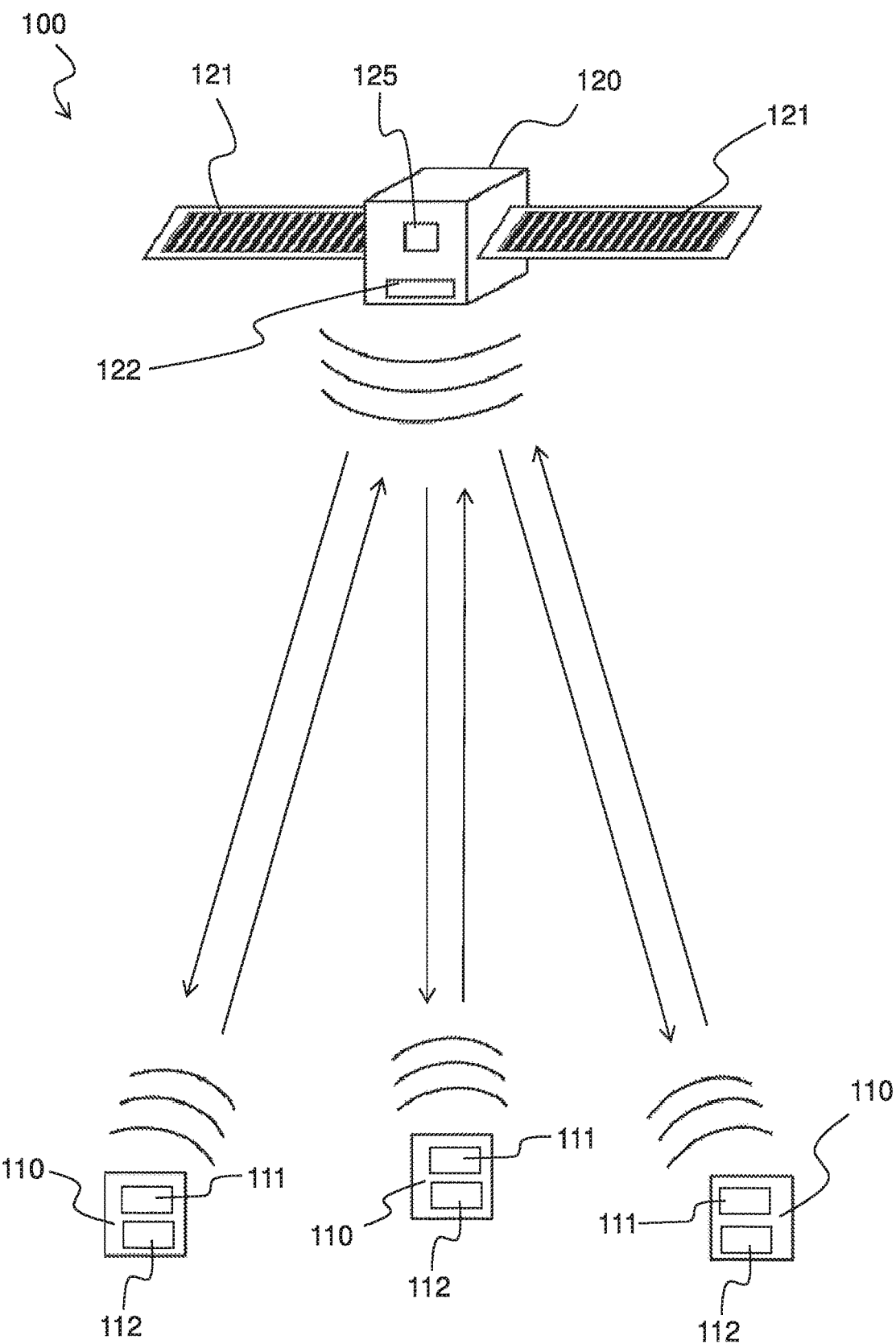
FIG. 1: a diagrammatical representation of an embodiment of a telecommunication system.

FIG. 1 diagrammatically shows a wireless telecommunication system 100 comprising a plurality of transmitter devices 110 and a satellite 120 of a constellation of nanosatellites placed into orbit beforehand around the Earth.

The transmitter devices 110 and the satellite 120 exchange data in the form of radio signals. The term "radio signal" means an electromagnetic wave that propagates via wireless means, of which the frequencies are included within the conventional spectrum of radio waves (a few hertz to several hundred gigahertz).

The transmitter devices 110 are in this non-limiting example of an aspect of the present disclosure connected objects that comprise telecommunication means 111 able to transmit signals to the satellite 120. It is suitable to underline that the transmitter devices 110, called in what follows connected objects 110, can also, in particular embodiments, exchange signals between them.

For example, the connected objects 110 further comprise an electronic board 112 provided with a microprocessor able to process data, even a computer memory that can store data before it is transmitted by the intermediary of signals.

The signals transmitted by the connected objects 110, and/or the signals transmitted by the satellite 120, are for example ultra narrow band (UNB) signals.

The UNB signals exchanged within the telecommunication system 100 include a carrier of which the frequency is for example of about a hundred MHz, even GHz. The bandwidth of the UNB signals is less than 2 kHz, even less than 1 kHz.

The telecommunication means 111 connected to the electronic board 112 of said connected object 110 comprise in this non-limiting example of the present disclosure an antenna able to transmit and receive UNB signals, a phase-locked loop and a super regenerative receiver.

The satellite 120 is in this example, a nanosatellite of the CubeSat type formed by a cubic structure with sides of ten centimeters. Two photovoltaic panels 121 deployed on either side of the cubic structure supply the satellite 120 with energy. The mass of the satellite 120 is substantially equal to five kilos. An antenna 122 directed towards the surface of the earth makes it possible to transmit or receive UNB signals to or from connected objects 110. It should be underlined that the satellite 120 is placed in an orbit of about five hundred kilometers around the Earth. The satellite 120 thus move around the Earth at a speed of about seven kilometers per second, and carry out a full revolution around the planet in a duration of about ninety minutes. More generally, the satellite 120 is in non-geosynchronous orbit, for example in an LEO (Low Earth Orbit) or MEO (Medium Earth Orbit).

The satellite 120 further comprises a beacon 125, which continuously transmits a UNB signal, called in what follows presence signal. The presence signal transmitted by the beacon 125 comprises for example a carrier of which the frequency, at the time of transmission, is for example constant over time.

In an alternative of this particular aspect of the present disclosure, the beacon 125 transmits presence signals discontinuously, preferably at regular intervals. The presence signals transmitted are for example of a limited duration, for example of about a few hundred milliseconds, a few seconds, even a few minutes.

It is suitable to underline that with a concern for saving energy, the connected object 110 is generally, but not in a limited manner, in standby mode most of the time and that it leaves this standby mode at regular intervals in order to listen for and/or transmit signals.

Figure 2:
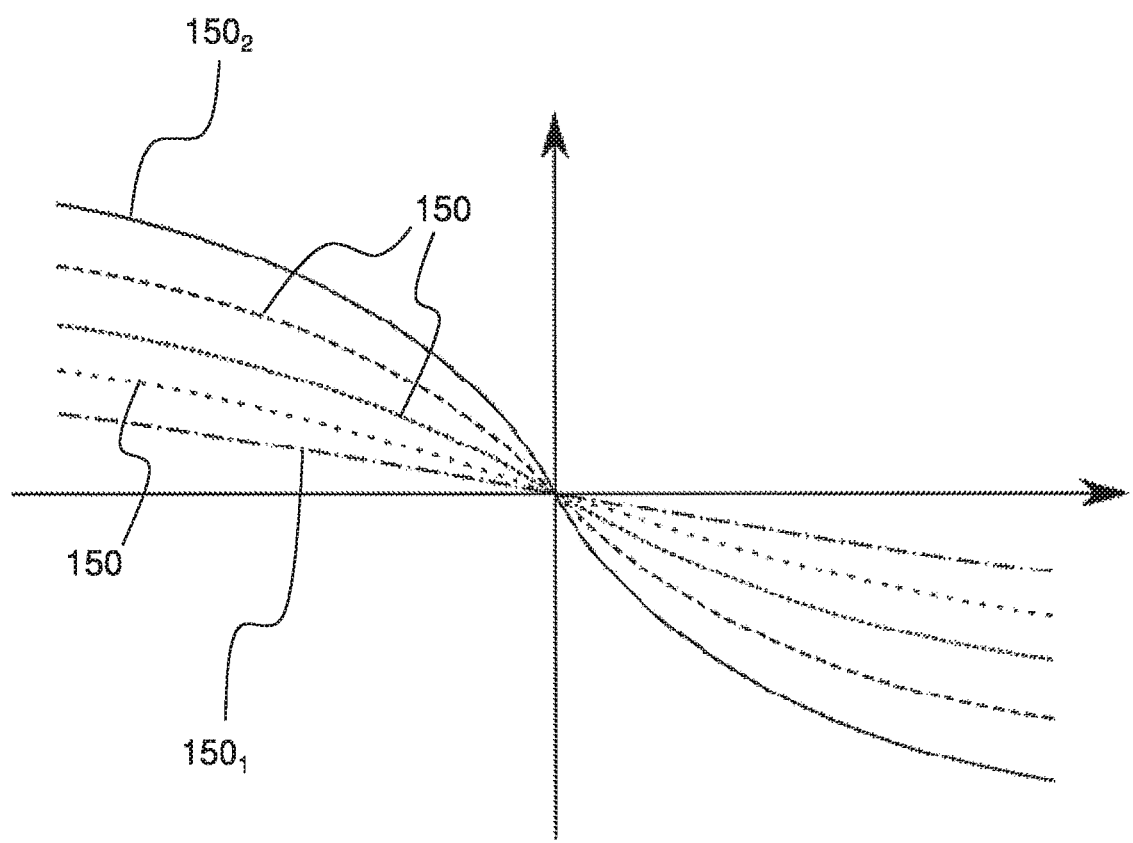
FIG. 2: curves showing the variations of the frequency shift according to the position of a satellite in relation to a transmitter device of the telecommunication system of FIG. 1, FIG. 3: a diagram showing an embodiment of a method of transmission of a signal by a transmitter device to a satellite.

FIG. 2 shows an example of curves 150 with a change over time of the frequency shift incurred by signals received by the connected object 110 coming from the satellite 120, according to the position of the satellite with respect to the connected object. FIG. 2 comprises five curves of which each one corresponds to a different maximum angle of elevation of the satellite 120 seen by the connected object 110. The maximum elevation angle, also referred to as the cross-track angle, the angle between the ground and the direction of the satellite 120, measured on the object when the satellite 120 is nearest to the connected object 110. The abscissa of the curves 150 corresponds in this example to the difference between the latitude of the satellite 110 and the latitude of the connected object 110. When the maximum elevation angle is low, as in the case of the curve 1501, the satellite 120 is seen by the connected object 110 as being close to the horizon, while when the maximum elevation angle is about ninety degrees, as in the case of the curve 1502, the connected object 110 is located substantially just under the trajectory of the satellite 120.

Figure 3:
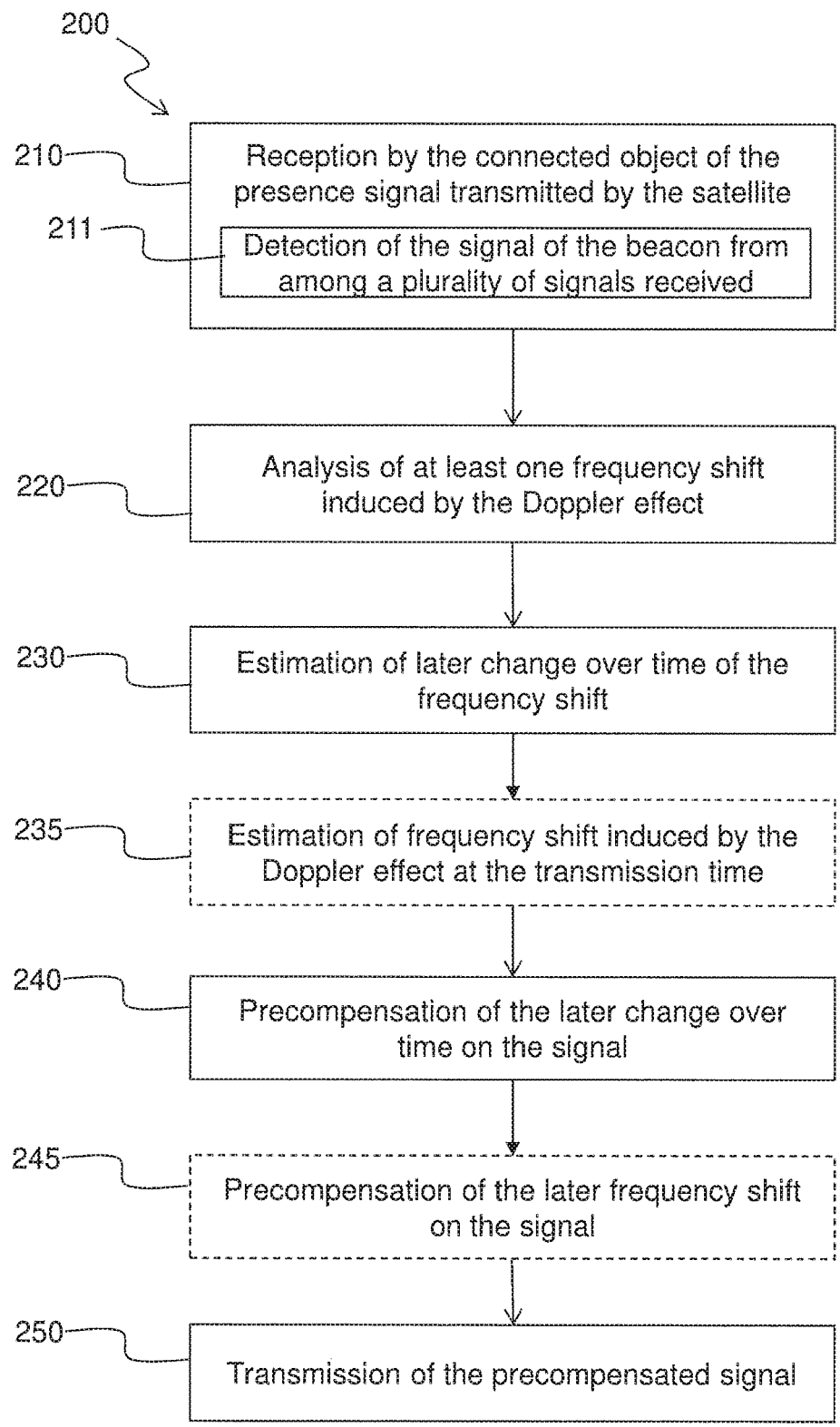

FIG. 3 shows in the form of a block diagram a method 200 for transmitting a signal between one of the connected objects 110 and the satellite 120 moving in orbit.

The method 200 comprises a step 210 of receiving by the connected object 110 of the presence signal transmitted by the satellite 120.

In preferred aspects, the presence signal comprises a carrier with a frequency fc_sat and at least one modulated subcarrier showing a predetermined frequency gap fs with respect to the frequency fc_sat in order to be able to differentiate the signals coming from beacons, from the signals coming from connected objects 110, that do not have this particular form or that have in the opposite case a predetermined frequency gap that is different from the frequency gap fs of the presence signal.

In other terms, the presence signal of the satellite 120 comprises a piece of information that makes it possible to identify the source of the presence signal, i.e. in this case of the beacon 125 of the satellite 120, by the intermediary of the presence of the modulated subcarrier having a predetermined frequency gap fs with respect to the frequency fc_sat. More generally, the identification information of the presence signal can be coded in the presence signal transmitted by the beacon 125 by any technique known to those skilled in the art.

It is suitable to underline that such a presence signal comprising a carrier and at least one subcarrier is of the self-synchronous type.

The presence signal transmitted by the beacon 125 with a carrier of frequency fc_sat is received by the connected object 110 with a carrier of frequency f'c_sat=fc_sat+Δf(t) where Δf(t) represents the frequency shift induced by the Doppler effect which varies over the course of the transmission of the presence signal of the beacon 125 from the satellite 120 to the connected object 110.

$$\Delta f(t) = \frac{v * \cos(\theta(t)) * \cos(\varphi(t) + E(t)) * f_c}{c}$$

where v represents the normal of the velocity vector of the satellite, fc the carrier of the signal transmitted, here equal to fc_sat, c the speed of light, θ the angle between the velocity vector of the satellite 120 and the plane defined by the satellite 120, the object 110 and the centre of the Earth, E the elevation angle between the horizon and the satellite 120 on the object 110, φ the angle, also referred to as coverage angle, between the sub-satellite point, i.e. the point of the satellite projected on the surface of the earth and the object 110.

It is suitable to underline that the frequency shift varies over time because the angles θ, E and φ vary according to the displacement of the satellite 120 in relation to the connected object 110.

Recognizing presence signals thanks to the presence of a subcarrier that has a predetermined frequency gap with respect to the carrier is advantageously used in the case of a telecommunication network, referred to as hybrid, comprising a plurality of connected objects and a plurality of satellites, wherein a connected object can receive signals coming from both a satellite and from another connected object.

The step 210 comprises for example a substep 211 of detecting the signal of the beacon 125 from among a plurality of signals received. To this effect, the super regenerative receiver included in the connected object 110 makes it possible to detect the presence signal transmitted by the beacon 125 thanks to the presence of the subcarrier in the presence signal, of which the frequency gap with respect to the carrier frequency of the presence signal is advantageously predetermined. It is suitable to underline that the super regenerative receiver advantageously has a very low energy consumption of about a hundred microwatts in active reception. The consumption of the super regenerative receiver can be reduced by carrying out recurring detections, that are not contiguous, through the intermediary of detection cycles. The increase in the latency between two consecutive detections makes it possible in particular to reduce the consumption of this receiver.

Moreover, it is suitable to underline that the super regenerative receiver is advantageously insensitive to the variations in frequency of the carrier and the subcarriers vary in a similar manner, as is the case when the presence signal is subjected to the Doppler effect.

Figure 4:
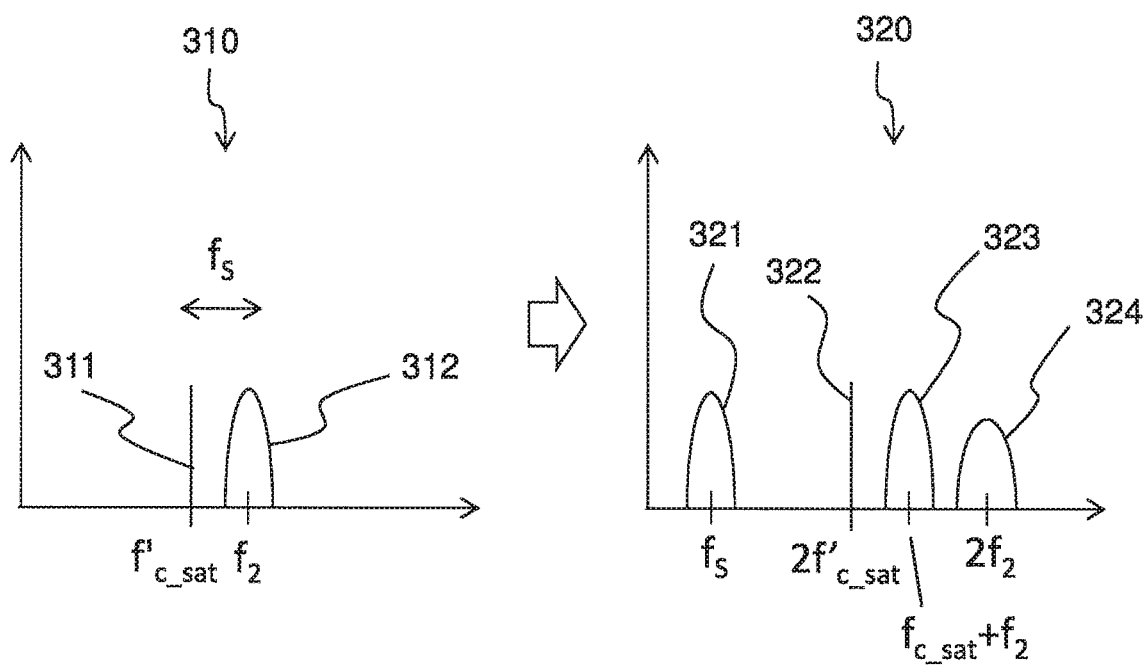
FIG. 4: two curves showing a processing carried out for detecting a presence signal transmitted by the satellite.

An example of a result obtained by this detection mechanism is shown in FIG. 4 which comprises a curve 310 before detection and a curve 320 after detection. The curve 310 comprises a carrier 311 of frequency fc_sat and a modulated subcarrier 312 of frequency f2. The frequency gap between the carrier and the subcarrier is equal to fs. The detection makes it possible to extract a signal 321 of frequency fs, a signal 322 of frequency 2fc_sat, a signal 323 of frequency fc_sat+f2 and a signal 324 of frequency 2f2.

An analysis of at least one frequency shift induced by the Doppler effect on the presence signal received by the connected object 110 is conducted during a step 220 of the method 200.

During this step of analysis 220, a measurement of a time change of the frequency shift Δf induced by the Doppler effect on the presence signal received by the connected object 110 is taken.

This measurement is for example taken by the intermediary of the phase-locked loop included in the connected object 110 by measuring the main frequency of the presence signal received by the connected object 110 at two separate instants at least, preferably at each instant of the receiving of the presence signal. The time change of the frequency shift Δf is indeed equal to the time variation of the main frequency of the presence signal received.

From the analysis of the frequency shift induced by the Doppler effect on the presence signal, an estimation of a later change over time of the frequency shift is carried out over the course of a step 230 of the method 200. This later change over time of the frequency shift is in particular calculated so as to predict the frequency shift incurred by the signal to be transmitted by the connected object 110 during the transmission thereof to the satellite 120. The later change over time of the frequency shift is thus estimated from a later predetermined time of the beginning of transmission of the signal to be transmitted by the device 110, termed the transmission time, and over a predetermined duration of this signal to be transmitted. This predetermined duration corresponds in particular to the transmission duration of the signal.

In preferred aspects of the present disclosure, the later change over time of the shift is estimated by extrapolation of the change over time of the frequency shift measured beforehand during the step 220.

The time change of the frequency shift measured beforehand can be represented by the intermediary of the theoretical curve Δf(t) of which the parameters are adjusted for example via curve regression methods, also called curve-fitting methods.

The estimation of the later change over time of the frequency shift can be carried out using this theoretical curve, of which the parameters have been adjusted.

Once the later change over time is estimated, a precompensating of the later change over time on the presence signal is carried out during a step 240 of the method 200.

In preferred aspects of the present disclosure, the step of precompensating 240 the later change over time of the frequency shift comprises a modulation of the signal to be transmitted with a frequency opposite the later change over time. The precompensating can be carried out for example through the intermediary of FM (Frequency Modulation) of which the modulated frequency is equal to the opposite of the variation to be precompensated.

It should be underlined that this FM modulation is applied over a conventional modulation for encoding binary data contained in the signal transmitted by the connected object 110. The conventional modulation for encoding binary data is, in this non-limiting example of the present disclosure, a modulation of the DBPSK (Digital Binary Phase-Shift Keying) type comprising a flow rate of 100 bits per second.

The precompensated signal is then transmitted, from the transmission time, during a step 250 of the method 200.

It is suitable to underline that the precompensating makes it possible in particular to obtain at the time of reception by the satellite 120 of the signal transmitted by the connected object 110, that the receiving frequency of the carrier of the signal by the satellite 120 is substantially constant all throughout reception.

The satellite 120 can consequently process the signal received without having to apply to it complex processing for correcting the time drift of the frequency due to the Doppler effect. It is thus possible to reuse the algorithms developed for the communication between immobile objects. The calculation power of the satellite is then used only to demodulate signals that have apparently not incurred any Doppler effect.

Moreover, it is suitable to underline that the precompensating proposed in this example does not take account of the absolute value of the frequency shift. The frequency of the carrier of the signal received by the satellite 120 is of course constant but is generally different from the frequency of the carrier of the signal at the time of the transmission thereof by the connected object 110.

To this effect, it can optionally be provided that the step of analyzing further comprises a measurement of a main frequency of the presence signal and an estimation of a frequency shift induced by the Doppler effect on the presence signal according to the main frequency measured and according to a theoretical main frequency of the presence signal. The theoretical frequency of the presence signal, which corresponds to the frequency of the carrier at the time of the transmission of the presence signal by the beacon 125, is in certain cases known in advance, in which case the beacon 125 transmits on a predetermined frequency that corresponds for example to a standard established beforehand. When the transmitting frequency of the carrier is a priori unknown, the value of said transmitting frequency can be for example coded in the presence signal, and modulates for example the modulated subcarrier of said presence signal. Measuring the main frequency can be in particular carried out thanks to the phase-locked loop included in the connected object 110.

Thus, the method 200 can also comprise a step 235 of estimating, according to the estimated frequency shift on the presence signal, a frequency shift induced by the Doppler effect at the transmission time of the signal to be transmitted, referred to as later frequency shift. A precompensating of the later frequency shift can also be carried out on the signal to be transmitted by the connected object 110, during a step 245 of the method 200, before or after the precompensating of the estimated later change over time of the frequency shift.

In this case, the receiving frequency of the carrier of the signal by the satellite 120 is substantially equal to the transmitting frequency of the carrier of said signal by the connected object 110, with the two precompensatings by the connected object 110.

Figure 5:
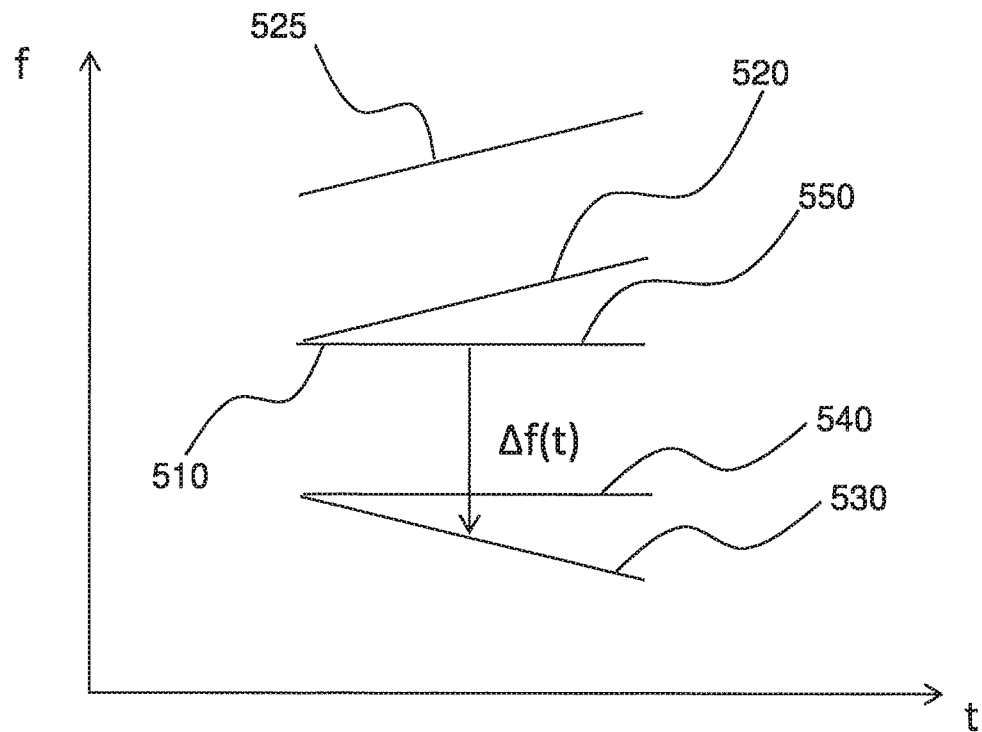
FIG. 5: curves showing the various processing carried out on a signal transmitted by a transmitter device of the telecommunication system.

FIG. 5 shows the change over time of the transmitting frequency of a carrier of a signal 510 transmitted by the connected object 110 without precompensating for the Doppler effect, of the same signal 520 transmitted with precompensating of the change over time of the frequency shift and of the same signal 525 transmitted with also the optional precompensating of the frequency shift.

The transmitting frequency of the carrier of the signal 510 without precompensating is constant during the transmission of the signal 510. The receiving frequency of the carrier of the signal 510 by the satellite 120 is shown on FIG. 5 by the signal 530. The difference between the signal 510 and the signal 530 corresponds to the frequency shift induced by the Doppler effect on the frequency of the carrier of the signal 510 during the transmission thereof. It is suitable to underline that this frequency shift, being a function of the speed and of the relative position of the satellite 120 with respect to the connected object 110, changes over time. In order to counterbalance the time frequency drift of the Doppler effect, a precompensating of the change over time of the frequency shift is carried out on the signal 510. The result obtained by this precompensating is the signal 520 that is seen by the satellite 120 at the time it is received as a signal 540 that has a receiving frequency of the carrier that is constant but generally different from the transmitting frequency of the carrier of the signal 510.

In order to obtain a receiving frequency of the carrier that is constant but also identical to the transmitting frequency of said carrier of the signal 510, a precompensating of the frequency shift can be applied to the signal 520, in such a way that the transmitting frequency of the carrier corresponds to that shown by the signal 525. When the signal 525 is transmitted by the connected object 110, it is received by the satellite as a signal 550 of which the receiving frequency of the carrier by said satellite 120 is constant and identical to the transmitting frequency of the carrier of the signal 510.

Optionally, the method 200 can also comprise a step of identification of the signals intended for the satellite 120 from among a plurality of signals received by the satellite 120. Given that the signals intended for the satellite 120 are precompensated, they are easy to identify because they do not require any prior processing for correcting the Doppler effect. This step is in particular useful in the case of a hybrid telecommunication system.

What is claimed is:

1. A method for transmitting a signal by a transmitter device to a satellite moving in orbit around the Earth, said transmitter device and the satellite comprising wireless telecommunication means,
wherein said method comprises:
receiving, by said transmitter device, a signal transmitted by the satellite, termed the presence signal;
analyzing a frequency shift induced by the Doppler effect on the presence signal received by said transmitter device, the step of analyzing comprising a measurement of a change over time of the frequency shift induced by the Doppler effect on the presence signal;
estimating, according to the analysis of the frequency shift induced by the Doppler effect on the presence signal, a later change over time of said frequency shift from a later predetermined time of the beginning of transmission of the signal to be transmitted by the transmitter device, termed the transmission time, and over a predetermined duration of said signal to be transmitted;
precompensating the later change over time estimated from the frequency shift on the signal to be transmitted; and
transmitting of the signal by said transmitter device from the transmission time.

2. The method according to claim 1, wherein precompensating the later change over time of the frequency shift comprises a modulation of the signal to be transmitted with a frequency opposite the later change over time.

3. The method according to claim 1, wherein the later change over time of the frequency shift is estimated by extrapolation of the change over time of the frequency shift measured the presence signal.

4. The method according to claim 1, wherein the measured change over time of the frequency shift is represented by a theoretical curve of which the parameters are calculated by a curve-fitting method.

5. The method according to claim 1, wherein analyzing comprises a measurement of a main frequency of the presence signal and an estimation of a frequency shift induced by the Doppler effect on the presence signal according to the main frequency measured and according to a theoretical main frequency of said presence signal, said method also comprising:
estimating, according to the estimated frequency shift on the presence signal, a later frequency shift induced by the Doppler effect to the effect of the transmission time of the signal to be transmitted, and
precompensating the later frequency shift on the signal to be transmitted.

6. The method according to claim 1, wherein analyzing implements a phase-locked loop.

7. The method according to claim 1, wherein the transmission of the presence signal is carried out continuously over a predetermined period.

8. Transmitter device of a wireless telecommunications system, where it implements the method for transmitting according to claim 1.

9. Wireless telecommunications system comprising at least one transmitter device according to claim 8, and at least one satellite moving in orbit around the Earth.

\* \* \* \* \*